United States Patent [19]

Hayashi

[11] Patent Number: 5,697,579
[45] Date of Patent: Dec. 16, 1997

[54] AIRCRAFT HAVING INFLATABLE TUBULAR SUPPORT STRUCTURE

[76] Inventor: Masahiko Hayashi, 12-22, Tsurumaki 3-chome, Setagaya-ku, Tokyo, Japan

[21] Appl. No.: 642,984

[22] Filed: May 6, 1996

[51] Int. Cl.⁶ .................................................. B64B 1/58
[52] U.S. Cl. ................................ 244/31; 244/98; 244/128
[58] Field of Search ........................... 244/24, 31, 125, 244/126, 128, 96, 98

[56] References Cited

U.S. PATENT DOCUMENTS

| | | | |
|---|---|---|---|
| 954,215 | 4/1910 | Schilling | 244/126 |
| 1,056,791 | 3/1913 | Hoffmann | 244/126 |
| 3,116,037 | 12/1963 | Yost | 244/31 |
| 3,384,328 | 5/1968 | McGee | 244/31 X |
| 3,957,228 | 5/1976 | Kennedy, Jr. | 244/128 X |
| 3,993,269 | 11/1976 | Crosby, Jr. | 244/31 X |
| 4,261,534 | 4/1981 | Roselli | 244/31 X |
| 5,115,998 | 5/1992 | Olive | 244/31 |

FOREIGN PATENT DOCUMENTS

| | | | |
|---|---|---|---|
| 6-24389 | 2/1994 | Japan | 244/128 |
| 57542 | 5/1946 | Netherlands | 244/24 |

*Primary Examiner*—William Grant
*Attorney, Agent, or Firm*—Jordan and Hamburg

[57] ABSTRACT

An airship has a flexible gas storage tube which forms a frame that maintains an inflated condition of an envelope of the airship permitting the envelope to be charged with hot air. A pump and valve are provided for supplying gas such as air, helium, and hydrogen to the gas storage tube.

4 Claims, 16 Drawing Sheets

AIRCRAFT HAVING INFLATABLE TUBULAR SUPPORT STRUCTURE

BACKGROUND OF THE INVENTION

The present invention relates to aircraft and provides an envelope, which is foldable during nonuse for an air balloon, para glider, and hang glider.

A conventional envelope can be folded during a time of nonuse and could be put away and was combined with a durable outer surface or heatproof inner skin.

The conventional envelope requires a lot of time and effort to inflate and expand to the envelope shape of the air balloon or airship. Since stiffness is low, it is difficult to provide resistance against wind and flight performance suffers because of the flexible quality.

SUMMARY OF THE INVENTION

It is an object of the present invention to provide an airship which can be folded and put away during nonuse.

It is another object of the present invention to provide an aircraft with more rigidity and a flexible gas storage tube which becomes a frame that maintains an inflated condition of an envelope with gas.

The prescribed and other objects and features of the present invention will be understood by reading carefully the following description in conjunction with the accompanying drawings.

The drawings are illustrative and are not limiting to the scope of the present invention.

DETAILED DESCRIPTION OF THE INVENTION

Figure 1:
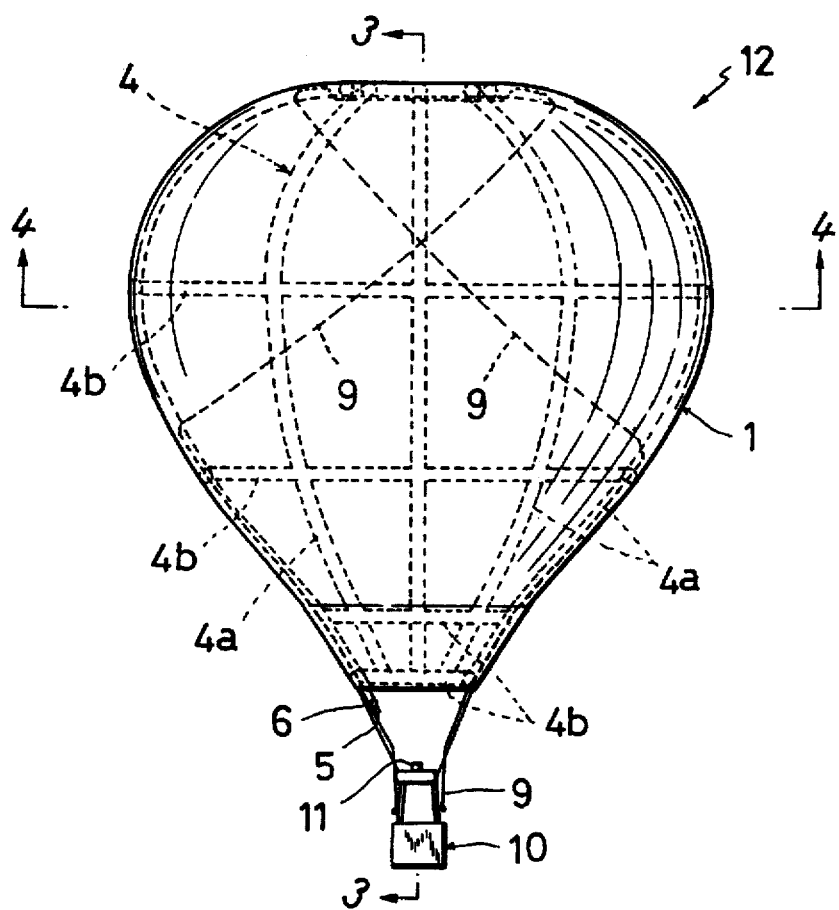
FIG. 1 is a front view showing a first embodiment of the present invention.
Figure 2:
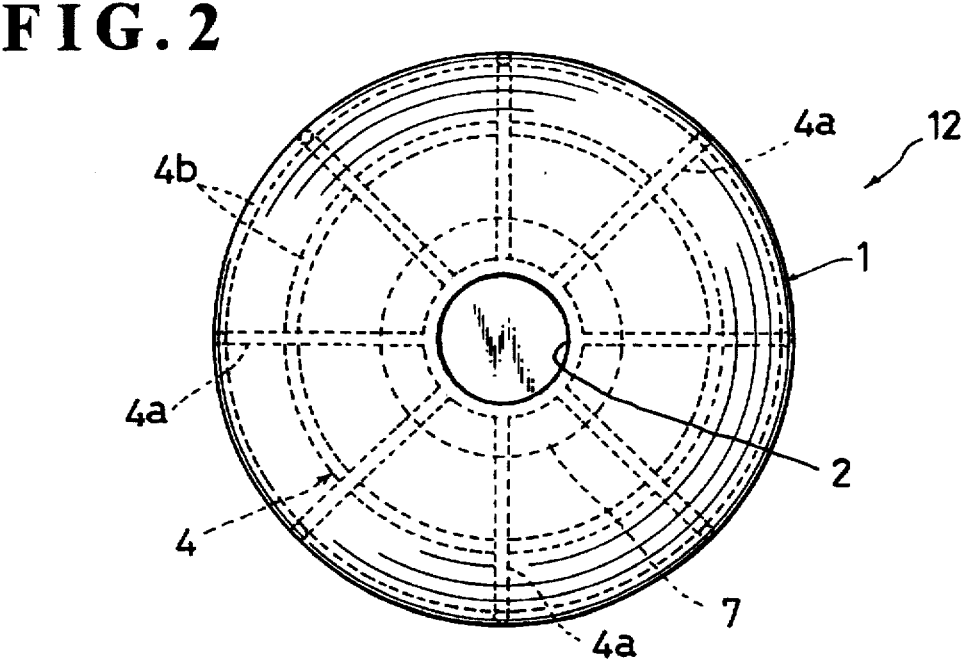
FIG. 2 is a side view showing the first embodiment of the present invention.
Figure 3:
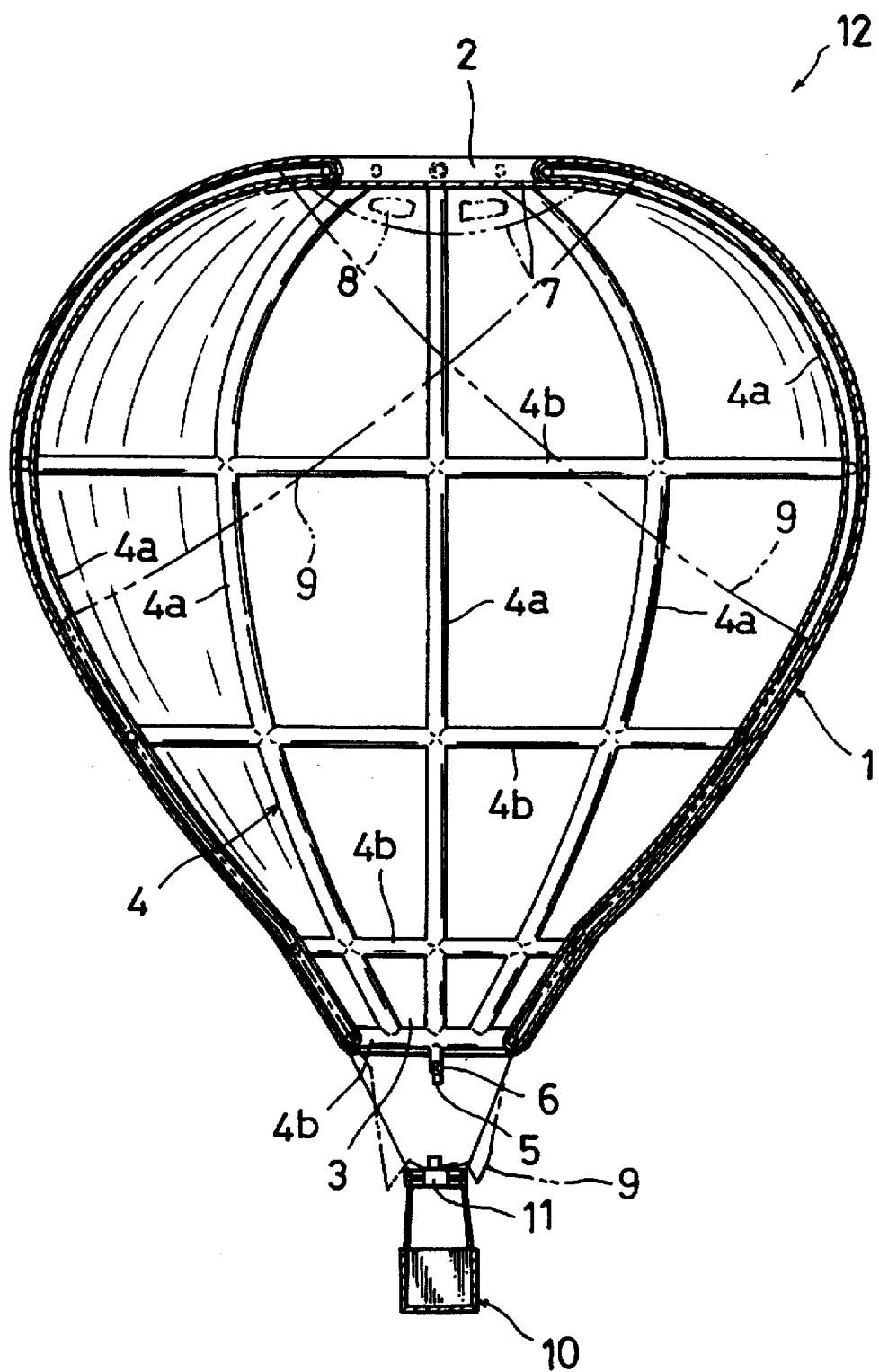
FIG. 3 is an expanded sectional view taken on line 3—3 of FIG. 1.
Figure 4:
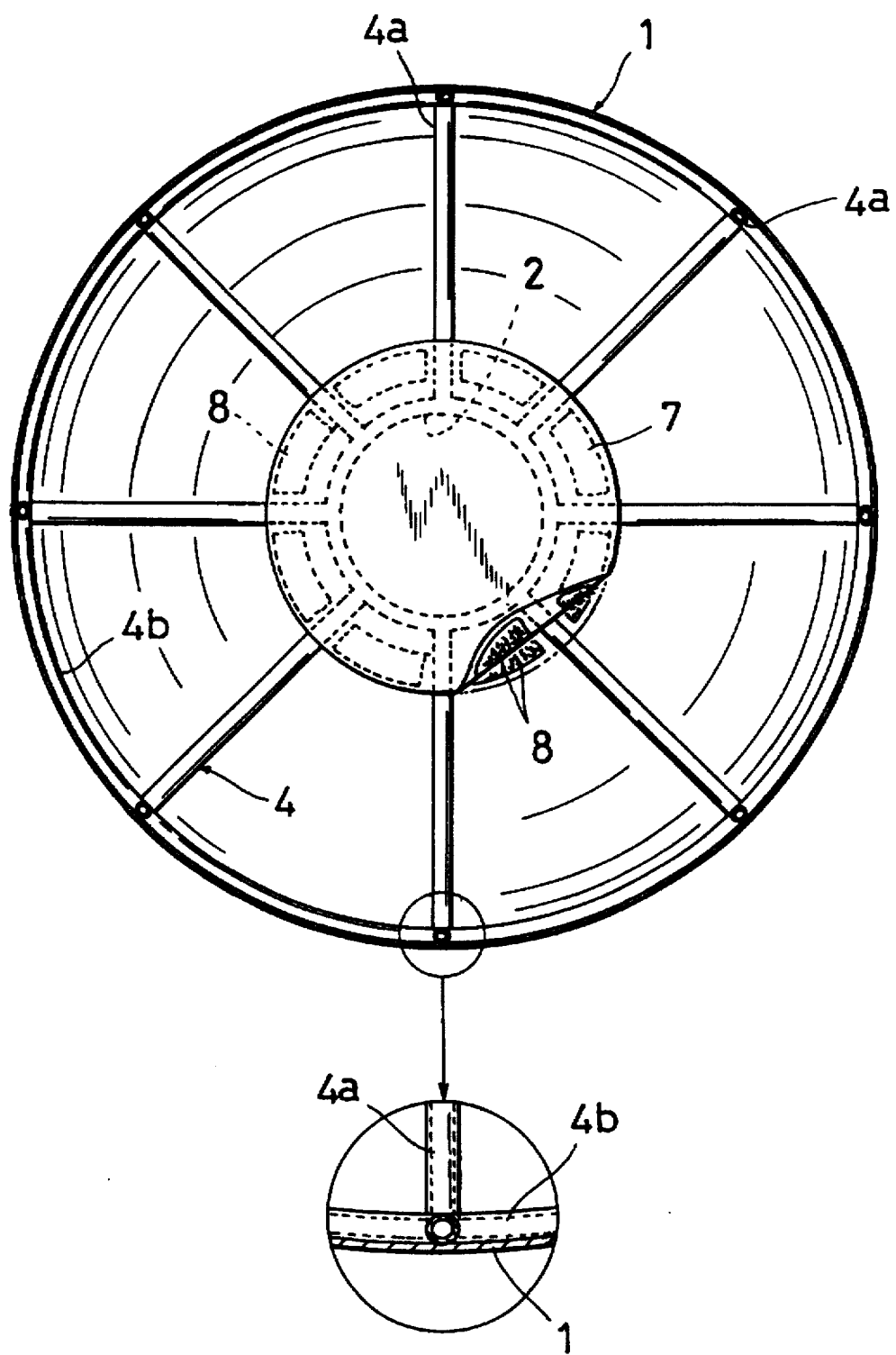
FIG. 4 is an expanded sectional view taken on line 4—4 of FIG. 1.
Figure 5:
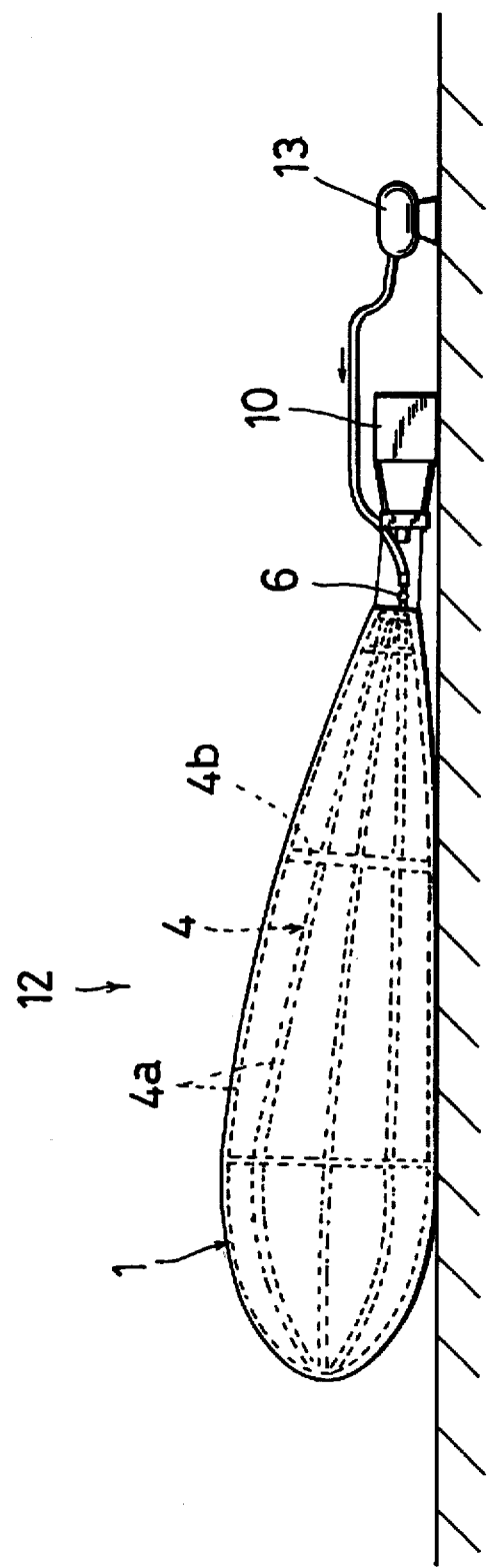
FIG. 5 is a diagram showing a condition for supplying air to the first embodiment of the present invention.

Preferred embodiments of the present invention will be described in more detail referring to the accompanying drawings.

FIGS. 1 to 5 illustrate an aircraft 12 of a first embodiment of the present invention wherein envelope 1 is formed in the shape of a hot air balloon. A release valve 2 for heat release is formed in an upper part of the envelope 1, and a mouth 3 for introducing heat is formed at a lower part of the envelope 1. Therefore, envelope 1 is formed of a material such as nylon and tetoron cloths with resinous coating for improving airtightness and protection from debasement.

A flexible gas storage tube 4 is a frame that maintains the inflated shape of the envelope 1 and comprises several vertical gas storage tubes 4a arranged equally spaced in a vertical manner all around the envelope 1, several horizontal gas storage tubes 4b formed in the shape of a ring in a horizontal direction around the envelope 1 and are connected with the vertical gas storage tubes 4a, and an opening and shutting valve 6 provided with a gas injection port 5 formed into the lowest part of the horizontal gas storage tube 4b to supply the vertical and horizontal gas storage tubes 4a and 4b with gas such as air, helium, and hydrogen. In addition, the horizontal gas storage tubes 4b are arranged at small intervals about the mouth 3 to maintain the mouth 3 open.

A parachute vent 7 is provided with a face fastener 8 covering a release valve 2 which can be open and shut. Also, a valve line 9 projects from the mouth 3 of the envelope 1 and operates the parachute vent 7.

A gondola 10 is provided under the envelope 1 by a suspension system. A burner 11 sends heat into the envelope 1 and is provided within the gondola 10.

The air craft 12 is first expanded by gas supplied to the horizontal gas storage tube 4b and vertical gas storage tube 4a using an air pump 13 connected to the gas injection port 5. Once the gas storage tubes 4 inflate, the gas injection port 5 is closed by shutting the valve 6.

Secondly, the envelope 1 is made to rise with the same operation as before, and it is able to fly.

During a time of nonuse, envelope 1 folds as before and can be put away.

Other embodiments of the present invention will now be described referring to FIGS. 6 to 27. Through the drawings of the embodiments, like components are denoted by like numerals as of the first embodiment and will not be further explained.

Figure 6:
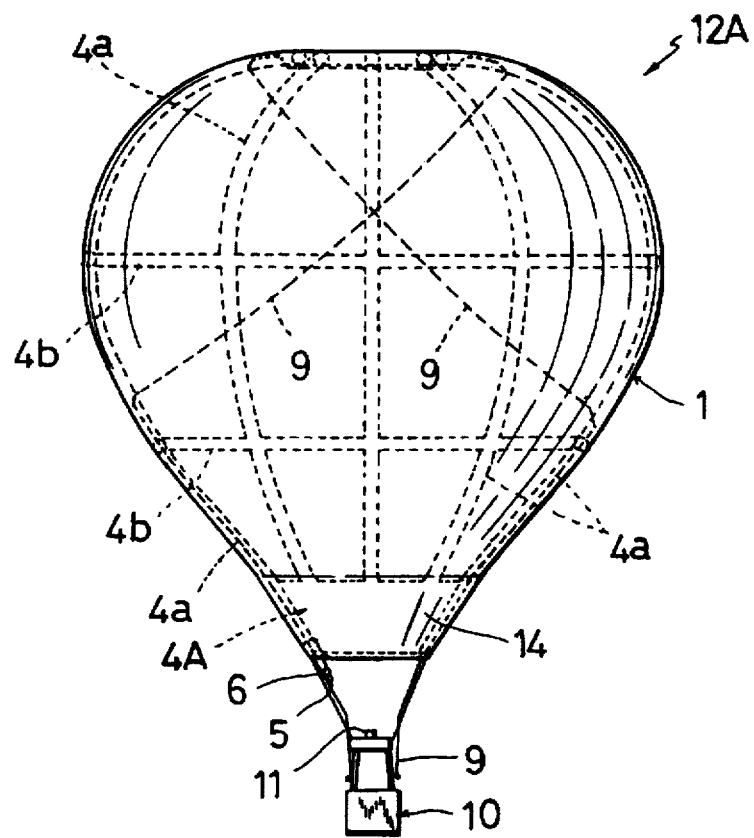
FIG. 6 is a front view showing a second embodiment of the present invention.
Figure 7:
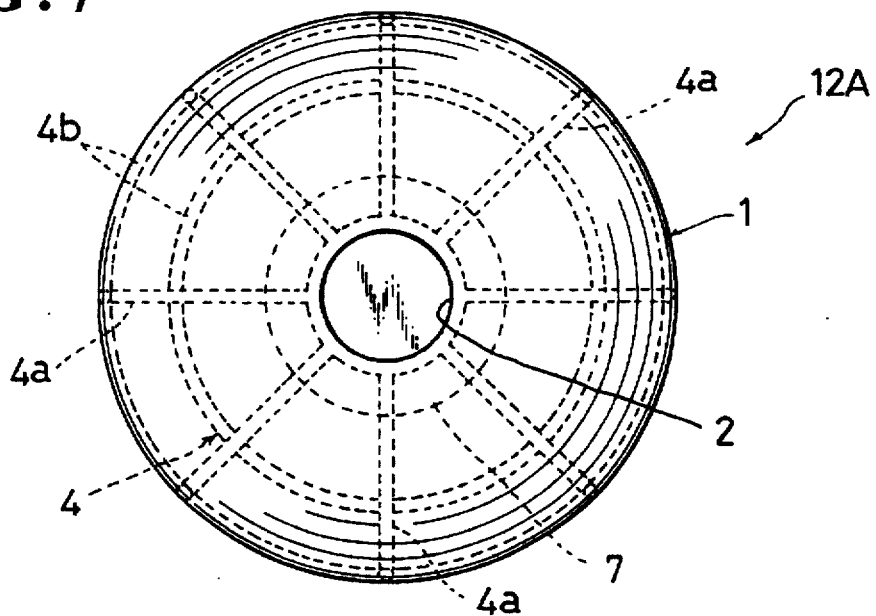
FIG. 7 is a top view showing the second embodiment of the present invention.

FIGS. 6 to 7 show a second embodiment of the present invention which is distinguished from the first embodiment by an inflatable skirt part 14 for supporting the mouth 3 of the envelope 1. An aircraft 12A with the skirt part 14 according to second embodiment will provide the same effects as the first embodiment.

Figure 8:
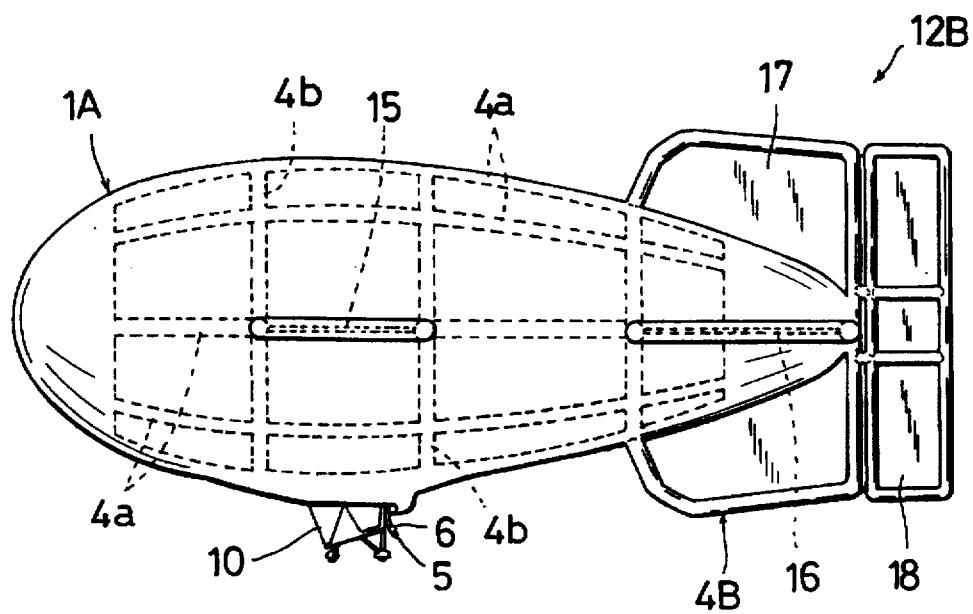
FIG. 8 is a front view showing a third embodiment of the present invention.
Figure 9:
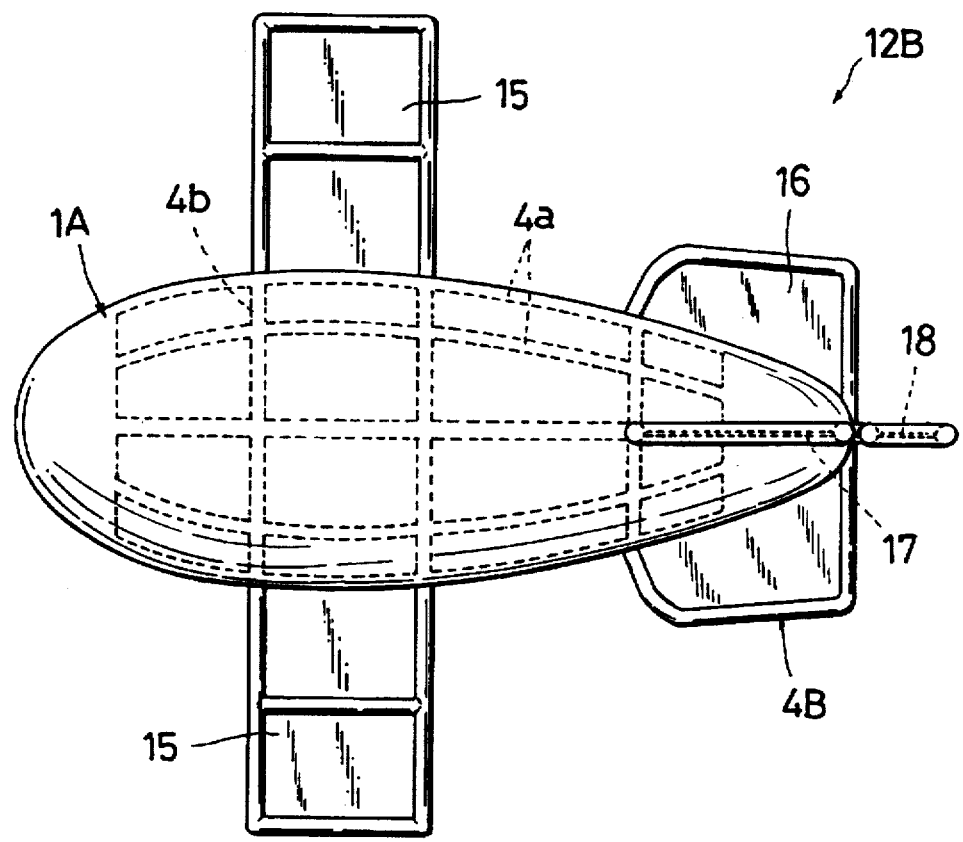
FIG. 9 is a top view showing the third embodiment of the present invention.

FIGS. 8 to 9 show a third embodiment of the present invention which is distinguished from the first embodiment by an aircraft 12B having instead of the envelope 1 and the gas storage tube 4 an envelope 1A and gas storage tubes The aircraft 12B has on the envelope 1A a flexible gas storage tube 4B enabling a shape of a wing 15 to be maintained along with a horizontal fin 16, vertical fin 17, and rudder 18 by virtue the pressure of a supply of gas. The envelope 1A maintains the airship's shape using the gas storage tube 4a and 4b. Additionally, each of the gas storage tubes 4a, 4b, and 4B may be folded and put away when gas is released from each tube.

Figure 10:
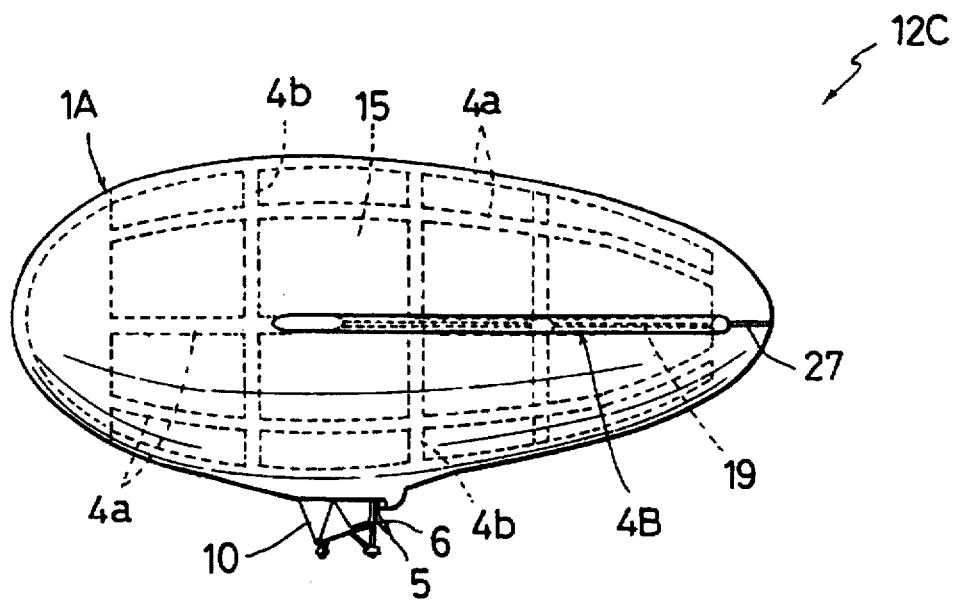
FIG. 10 is a front view showing a fourth embodiment of the present invention.
Figure 11:
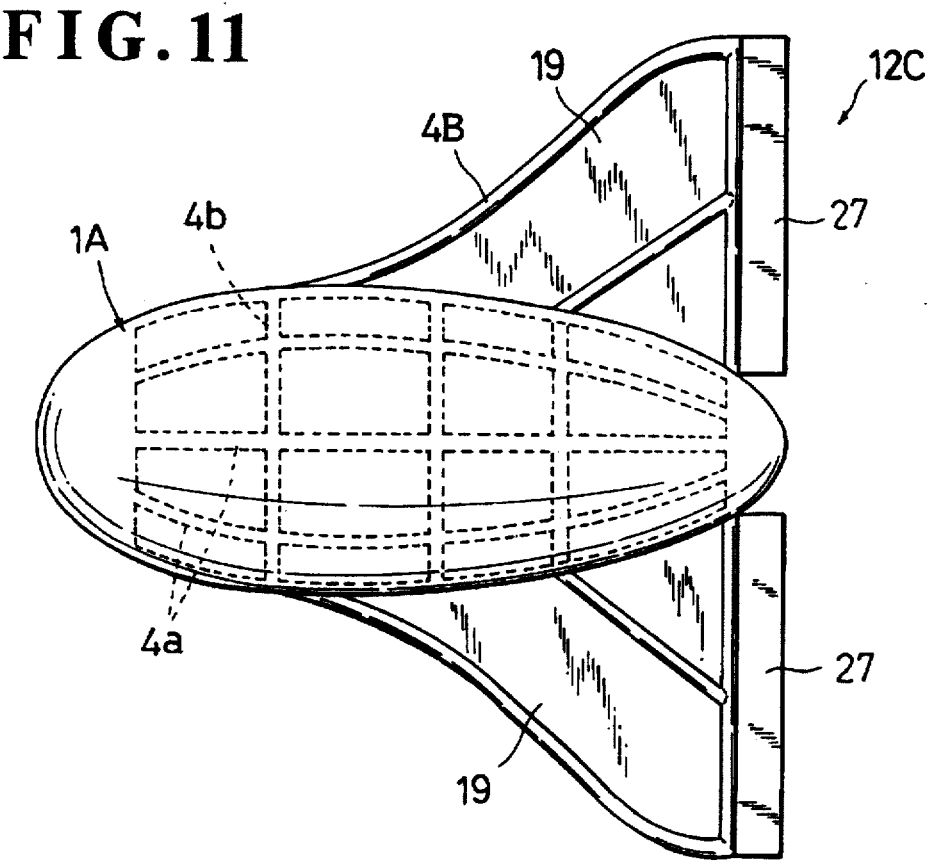
FIG. 11 is a top view showing the fourth embodiment of the present invention.

FIGS. 10 to 11 show a fourth embodiment of the present invention which is distinguished from the third embodiment by a wing 19 with a flap 27 which provides a triangle formed by flexible gas storage tubes 4B extending from the envelope 1A. An aircraft 12C with the wing 19 according to the fourth embodiment will provide the same effects as the first embodiment.

Figure 12:
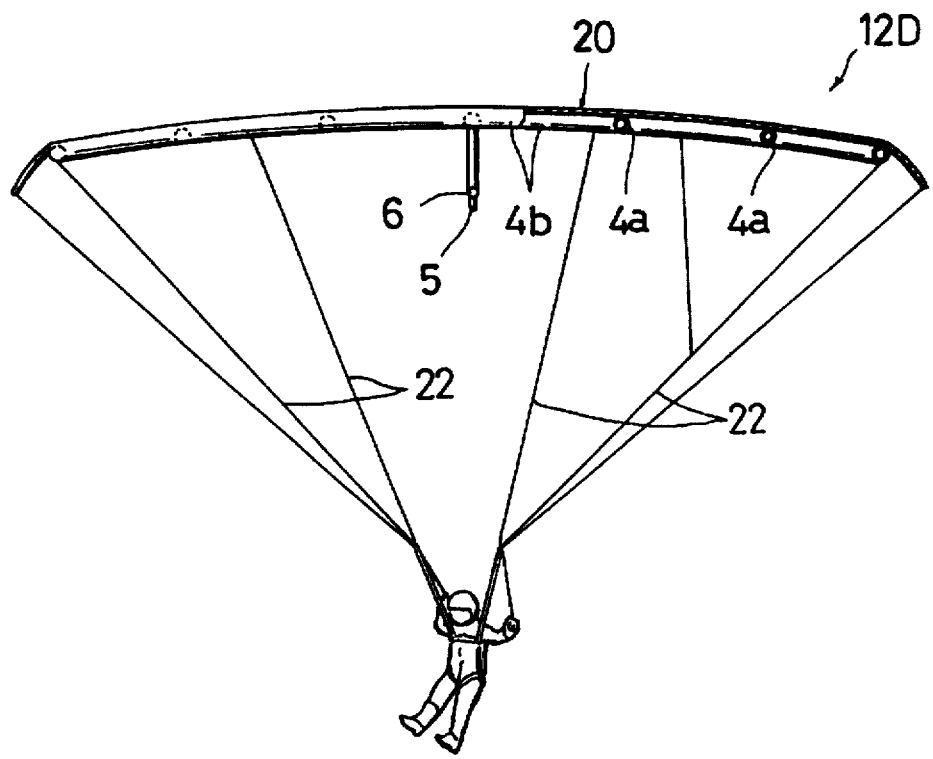
FIG. 12 illustrates a front view, partly in cross section, showing a fifth embodiment of the present invention.
Figure 13:
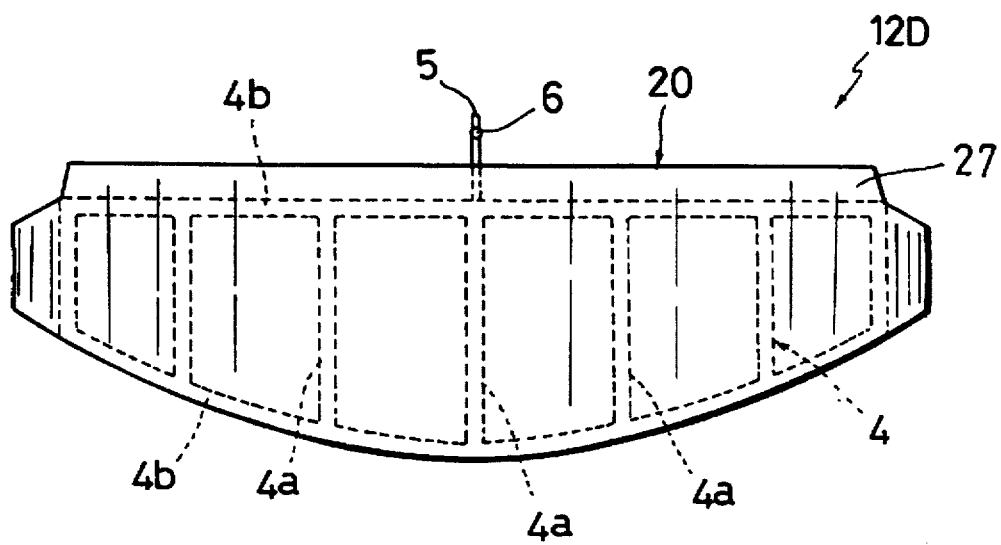
FIG. 13 is a top view showing the fifth embodiment of the present invention.

FIGS. 12 to 13 show a fifth embodiment of the present invention which is distinguished from the fourth embodiment by a vertical gas storage tube 4a and a horizontal gas storage tube 4b provided in an envelope 20 to form the shape of a para glider's wing when expanded. An aircraft 12D has the shape of a para glider's wing maintained the expanded condition by a supply gas inflating the vertical gas storage tubes and the horizontal gas storage tubes.

Figure 14:
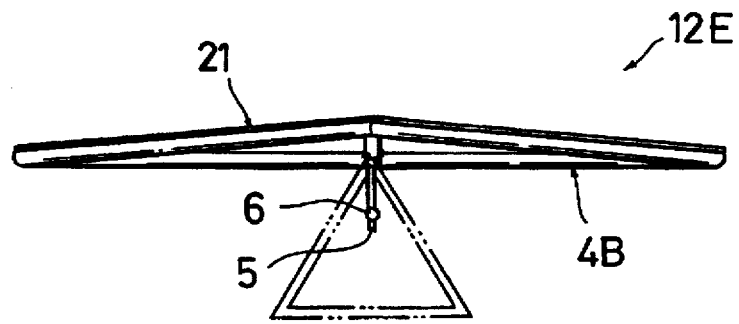
FIG. 14 is a front view showing a sixth embodiment of the present invention.
Figure 15:
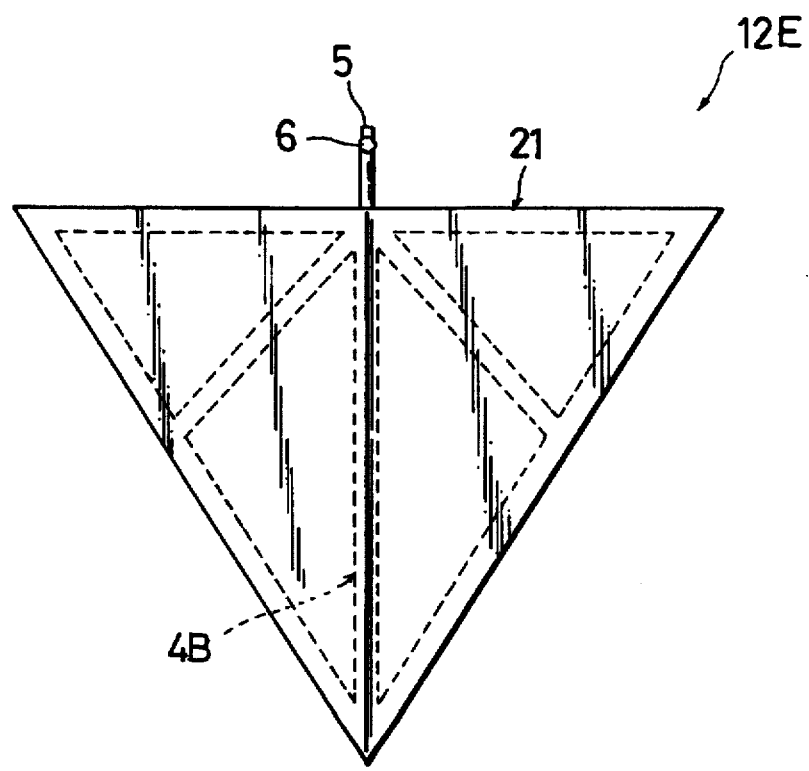
FIG. 15 is a top view showing the sixth embodiment of the present invention.

FIGS. 14 to 15 show a sixth embodiment of the present invention which is distinguished from the fourth embodiment by an air storage tube 4B which maintains an envelope 21 in the shape of a hang glider. An aircraft 12E with the air storage tube 4B according to sixth embodiment will provide the same effects as the fourth embodiment.

Figure 16:
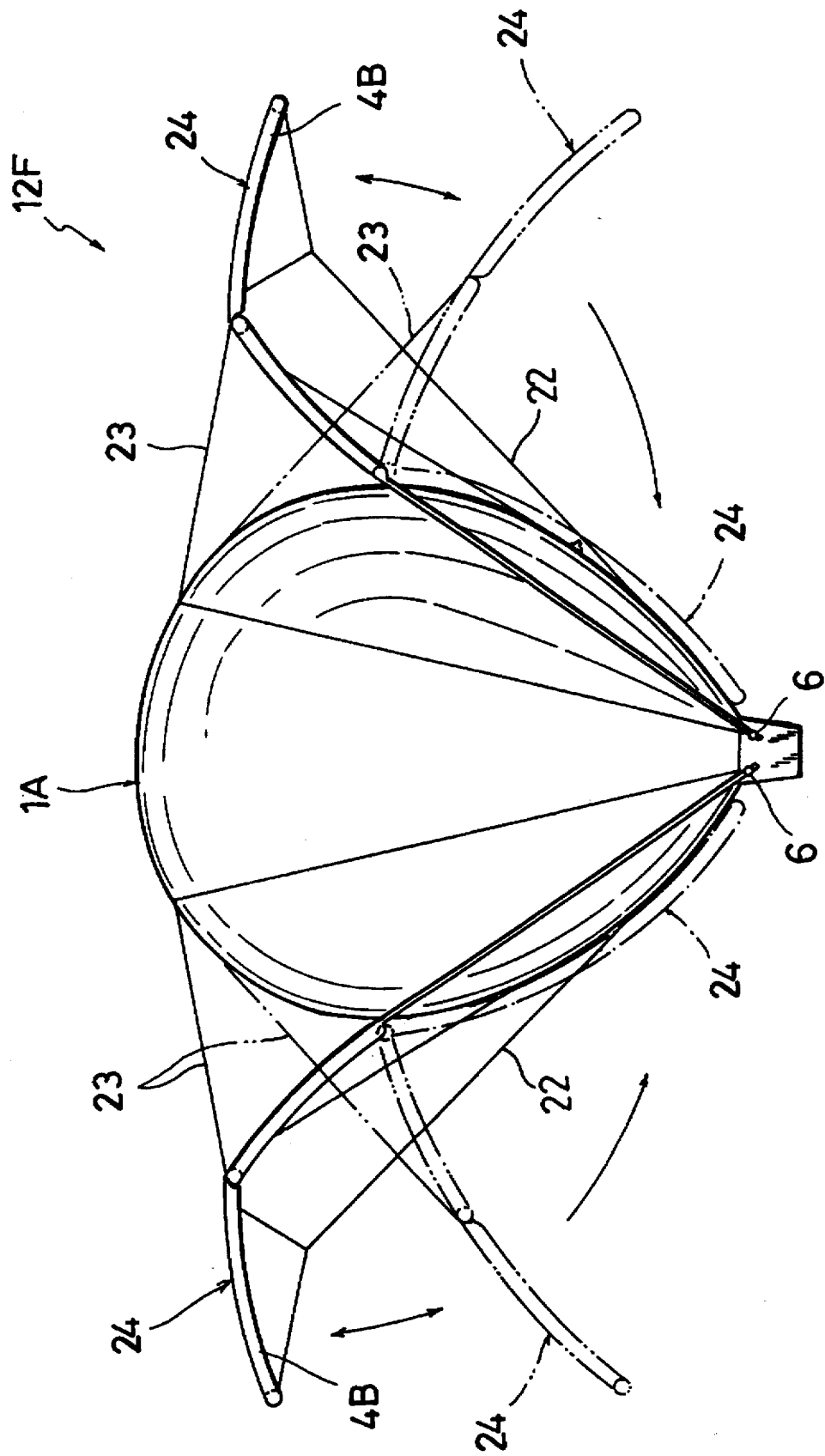
FIG. 16 is a front view showing a seventh embodiment of the present invention.
Figure 17:
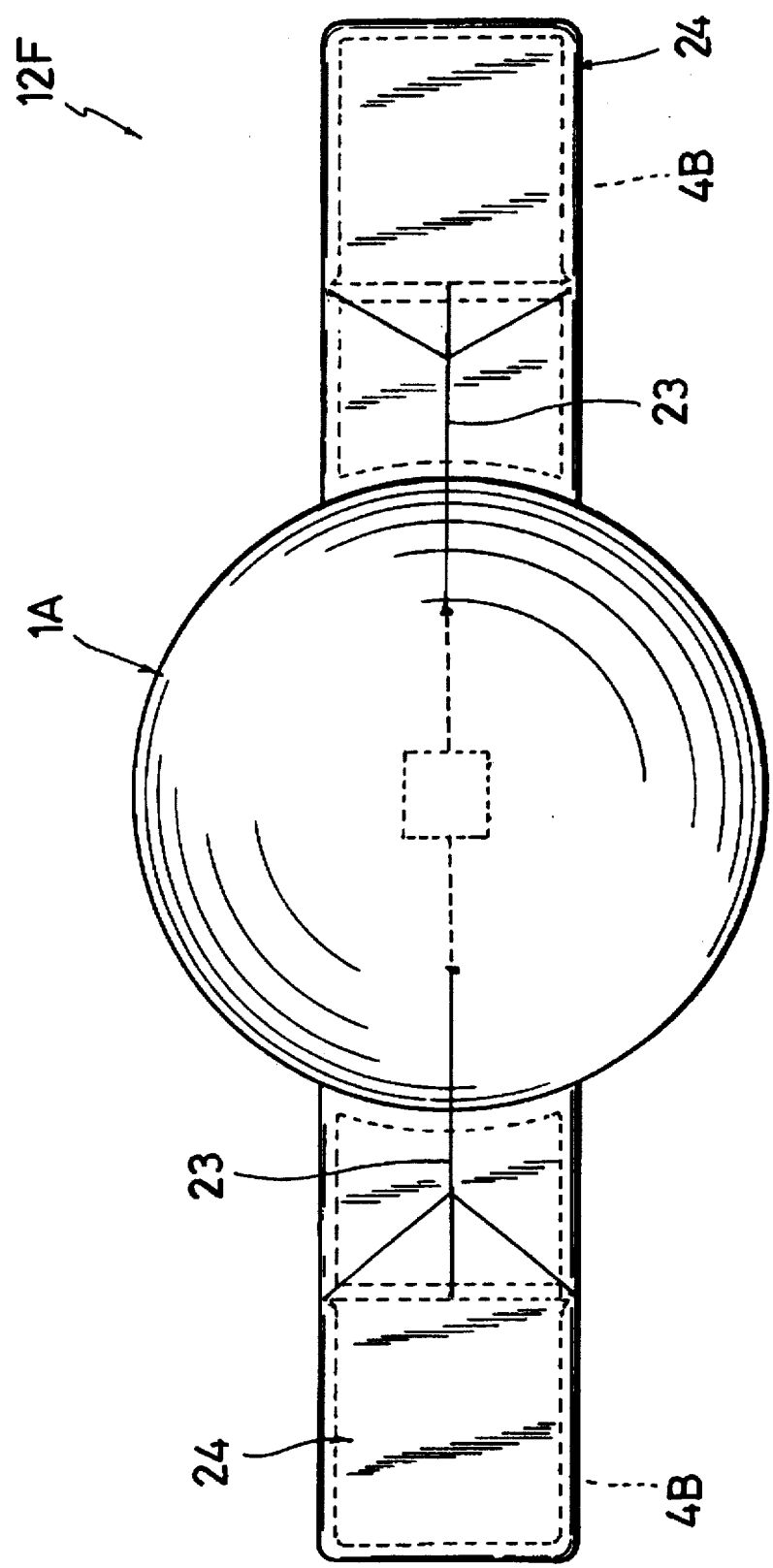
FIG. 17 is a top view showing the seventh embodiment of the present invention.

FIGS. 16 to 17 show a seventh embodiment of the present invention which is distinguished from the first embodiment by a flying wing 24 which is movable using a holding rope 22 and a pulling rope 23. The air storage tube 4B is expanded to maintain the shape of the flying wing 24. An aircraft 12F with the flying wing 24 fixed to the envelope 1A according to seventh embodiment will provide the same effects as of the first embodiment.

Figure 18:
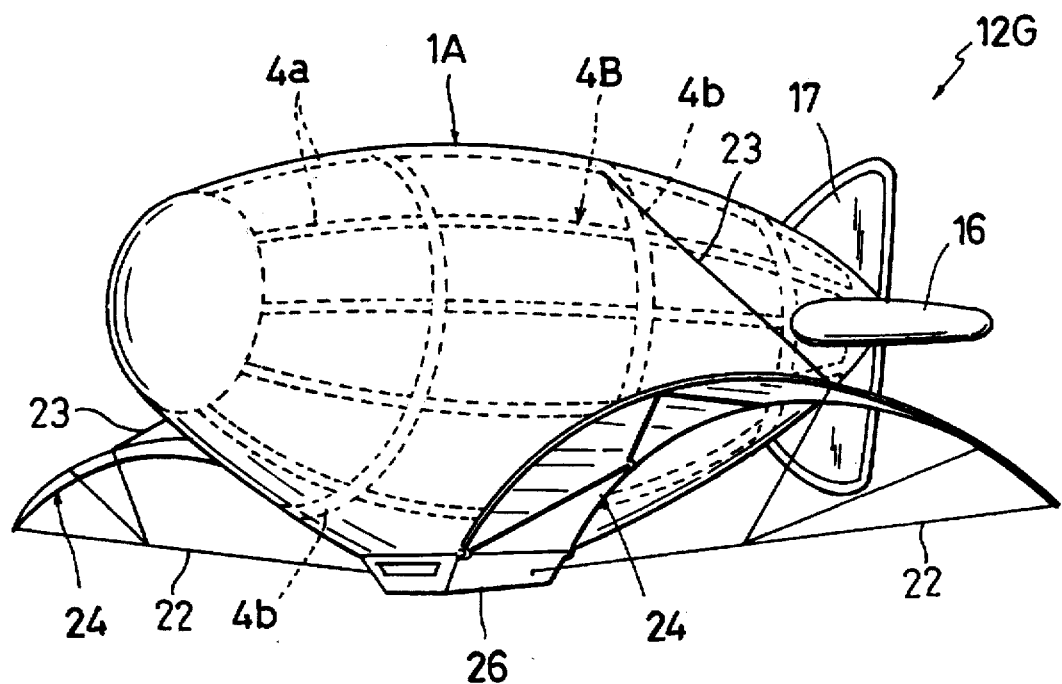
FIG. 18 is a perspective view showing an eighth embodiment of the present invention.
Figure 19:
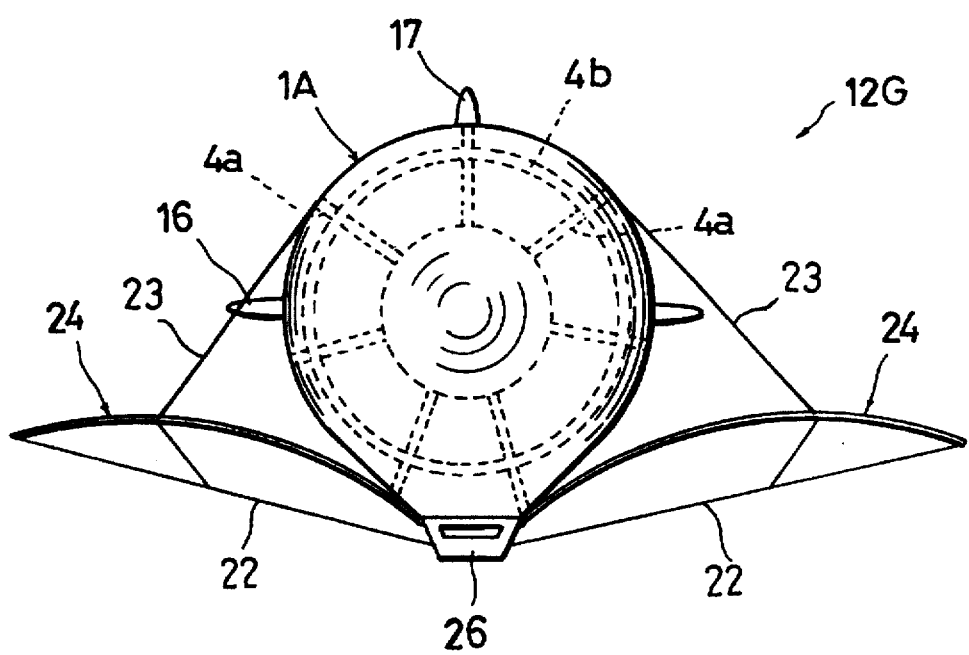
FIG. 19 is a front view showing the eight embodiment of the present invention.

FIGS. 18 to 19 show an eighth embodiment of the present invention which is distinguished from the third embodiment by a fluttering wing 24 having an air tube frame depending from the gondola 26 near a central part under the envelope 1A. An aircraft 12G with the fluttering wing 24, 24 will provide the same effects as of the third embodiment.

Figure 20:
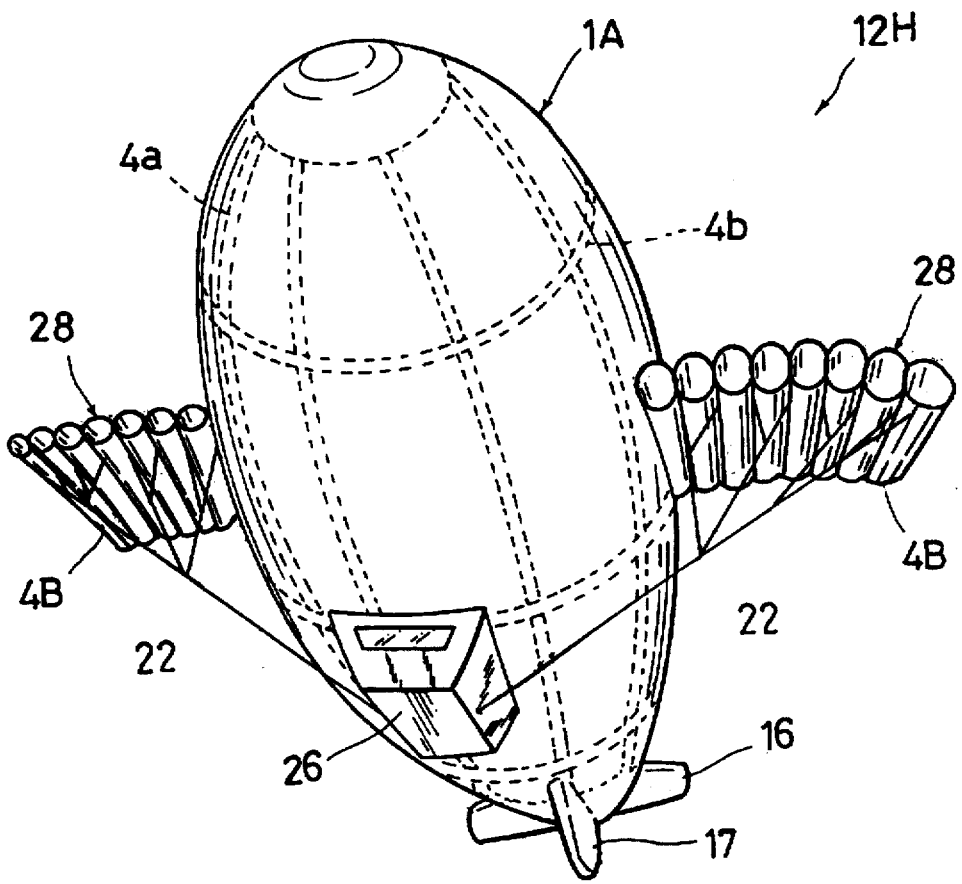
FIG. 20 is a perspective view showing a ninth embodiment of the present invention.
Figure 21:
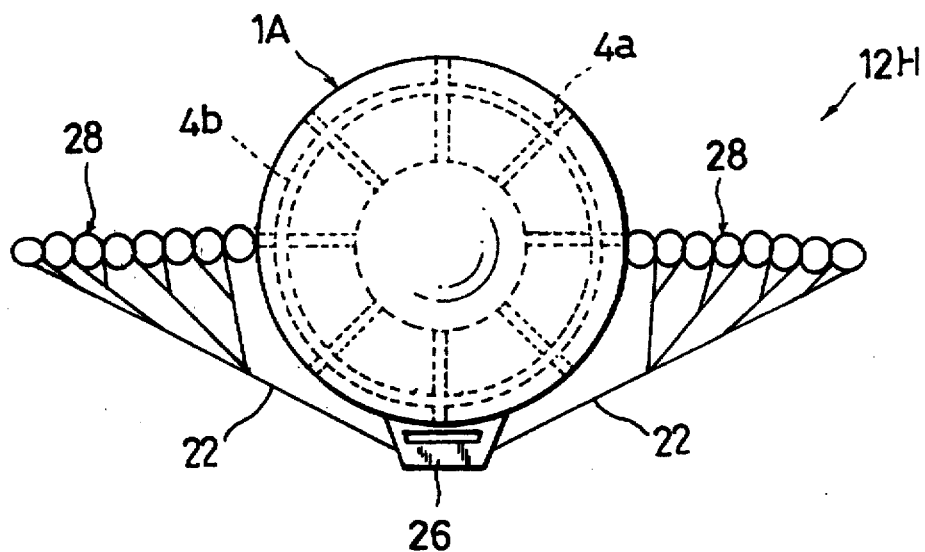
FIG. 21 is a front view showing the ninth embodiment of the present invention.

FIGS. 20 to 21 show a ninth embodiment of the present invention which is distinguished from the third embodiment by a wing 28 similar to a para-glider which is installed on both sides of the envelope 1A. An aircraft 12H with the wings 28, 28 will provide the same effects as of the third embodiment.

Figure 22:
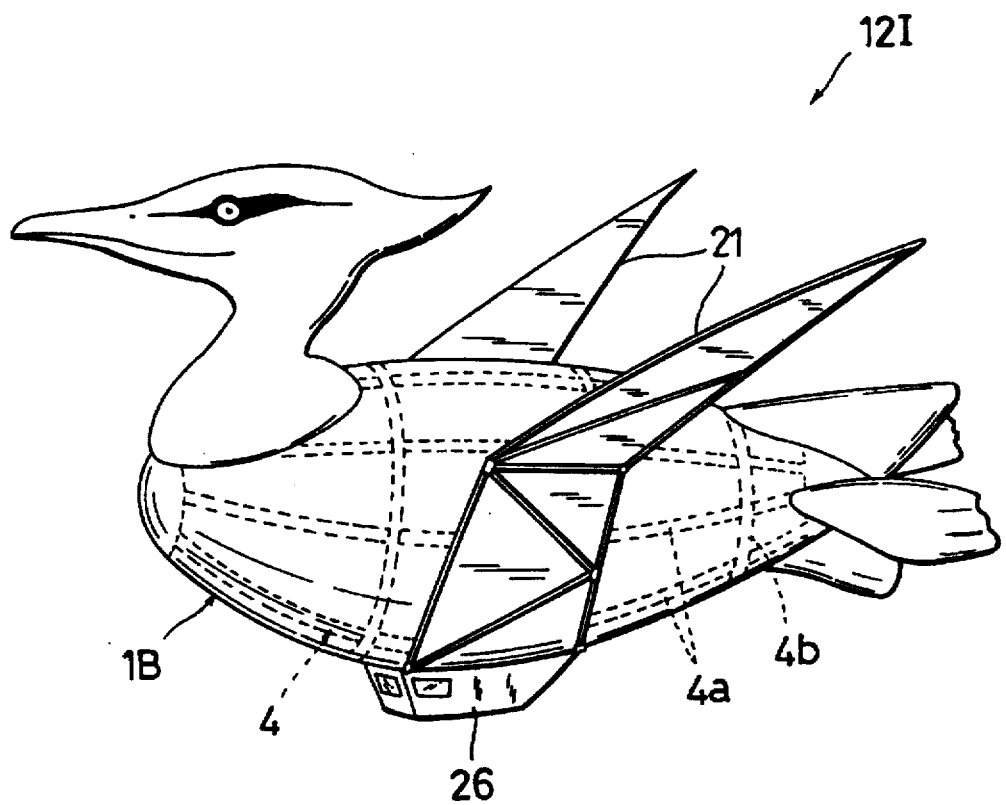
FIG. 22 is a perspective view showing a tenth embodiment of the invention.
Figure 23:
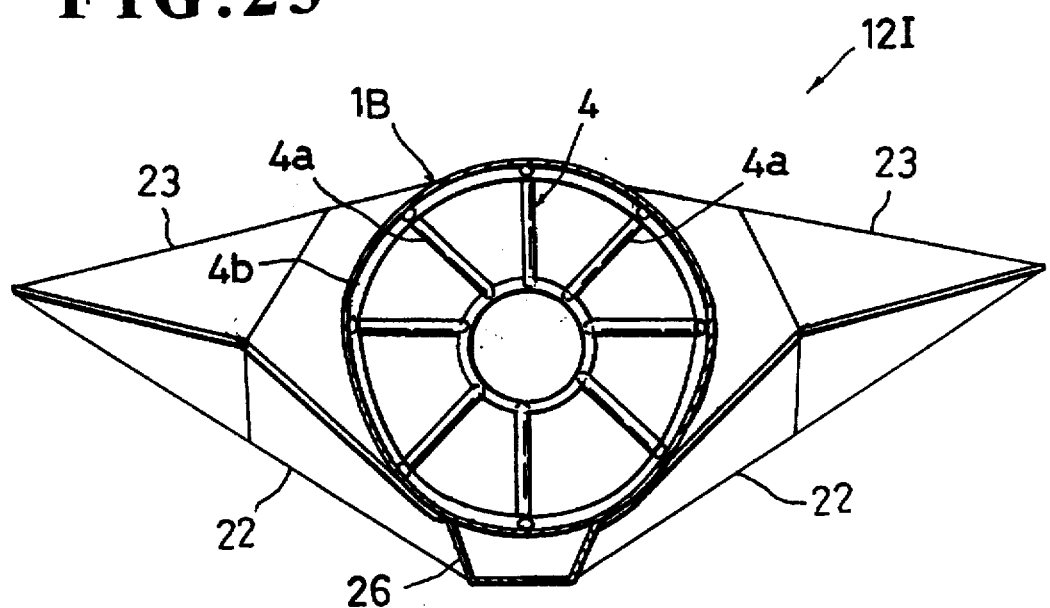
FIG. 23 is a longitudinal sectional view showing the tenth embodiment of the present invention.

FIGS. 22 to 23 show a tenth embodiment of the present invention which is distinguished from the ninth embodiment by an envelope 1B shaped like a bird. An aircraft 12I with the envelope 1B according to the tenth embodiment will provide the same effects as of the ninth embodiment.

Figure 24:
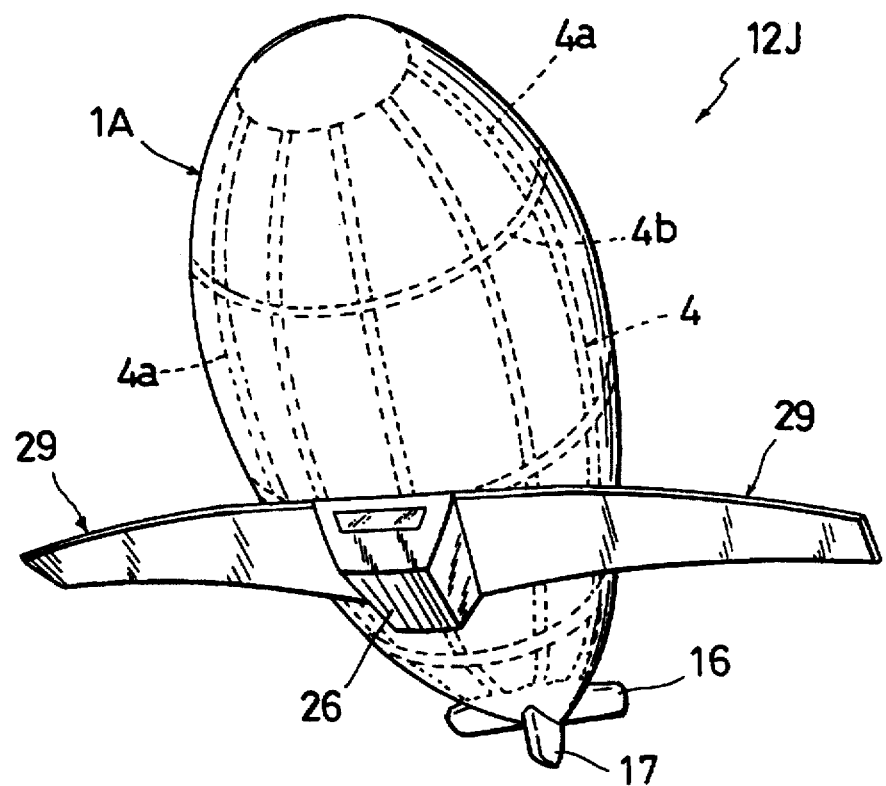
FIG. 24 is a perspective view showing an eleventh embodiment of the present invention.
Figure 25:
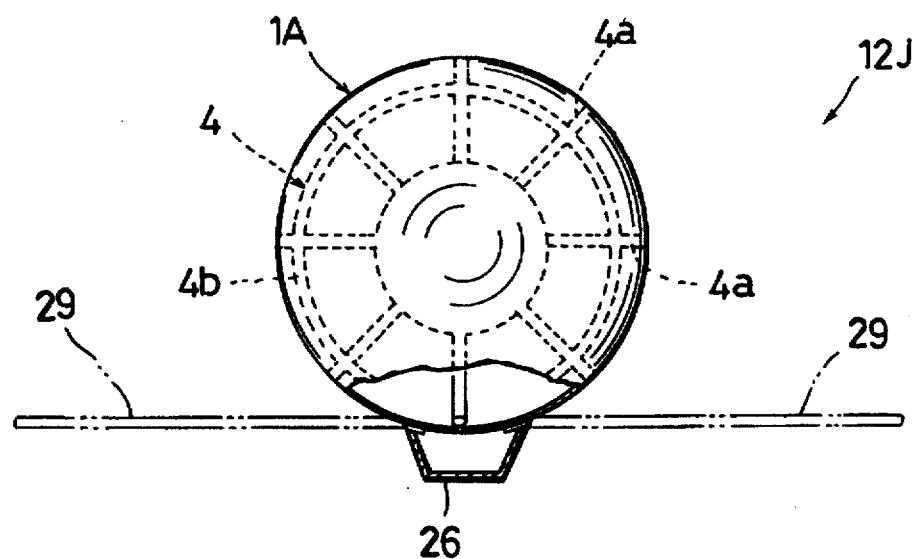
FIG. 25 is a front view showing the eleventh embodiment of the present invention.

FIGS. 24 to 25 show an eleventh embodiment of the present invention which is distinguished from the ninth embodiment by an envelope 29, 29 which is formed in the shape of a glider and is installed on an upper part of the gondola 26 and which is possible to set up and remove. An aircraft 12J according to eleventh embodiment will provide the same effects as of the ninth embodiment.

Figure 26:
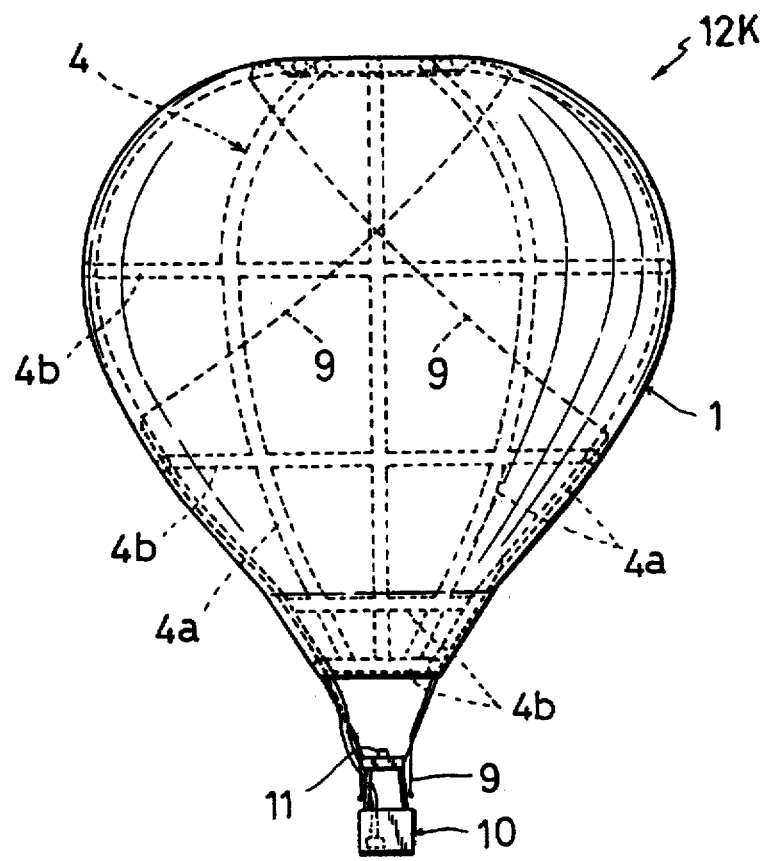
FIG. 26 is a perspective view showing a twelveth embodiment of the present invention.
Figure 27:
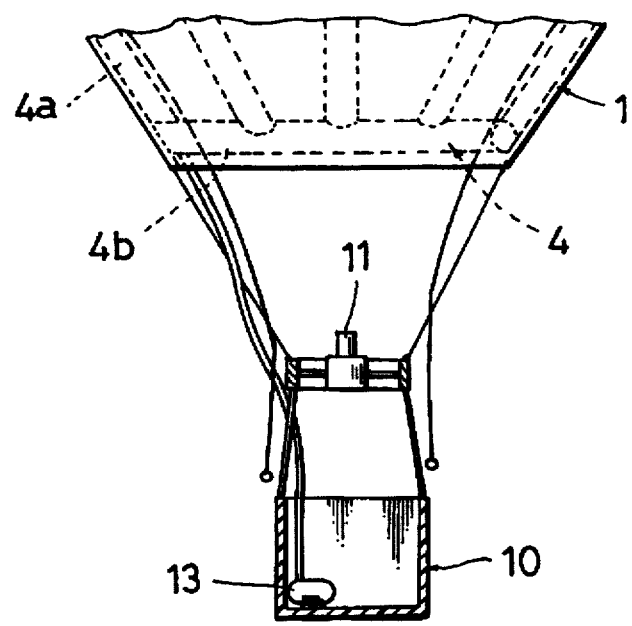
FIG. 27 is a typical sectional view showing of the twelveth embodiment of the present invention.

FIGS. 26 to 27 show a twelveth embodiment of the present invention which is distinguished of the first embodiment by an air pump 13 connected to the lowest part of the horizontal gas storage tube 4b as the equipment to maintain and supply gas including air. An aircraft 12K with the air pump 13 according to twelveth embodiment will provide the same effects as that of the first embodiment.

As set forth above, the advantages of the present invention are as follows:

(1) Since an aircraft comprises an envelope which may be folded and stored away during nonuse, a flexible gas storage tube in the envelope which maintains a shape of the envelope when inflated, an equipment which maintains and supplies gas like air, helium, and hydrogen into the flexible gas storage tube to inflate and supply gas into the flexible gas storage tube.

Therefore, inflating the envelope can be performed comfortably and easily.

(2) As depicted in the above paragraph (1), it can be put away as before and is put away in a compact condition by removing gas within the gas storage tube.

(3) As depicted in the above paragraph (1), though the structure is light by simplicity, the rigidity, which is important in an air balloon and an airship, can be effected and a resistance against wind and flight performance is improved greatly.

(4) As depicted in the above paragraph (1), since the structure is simple, it is possible to manufacture it easily. Also a mouth part is securely opened by a gas storage tube and it can be used safely in conjunction with a burner for a hot air balloon.

What is claimed is:

1. An airship comprising:

an envelope for containing hot air for providing buoyancy during use of said airship, said envelope having a charging opening, at a bottom portion thereof, for receiving said hot air and said envelope being foldable for storage during a time of nonuse of said airship;

said envelope having an inflatable robe structure which is inflatable to maintain said envelope in at least a partially inflated posture and to support said charging opening in an open condition for receiving said hot air during inflation of said envelope with said hot air from a collapsed, non-inflated condition; and means for supplying a gas to said inflatable robe structure to maintain said inflatable tube structure in an inflated condition.

2. An airship according to claim 1, wherein the means for supplying a gas includes a gas injection port on said inflatable tube structure and a valve communicating said gas injection port with said inflatable tube structure.

3. An aircraft according to claim 1, wherein said means for supplying a gas includes an air pump connected to said inflatable tube structure.

4. An airship comprising:

an envelope for containing hot air for providing buoyancy during use of said airship, said envelope having a charging opening, at a bottom portion thereof, for receiving said hot air and said envelope being foldable for storage during a time of nonuse of said airship;

said envelope having a first inflatable tube structure for maintaining said envelope in at least a partially inflated posture of said envelope;

said envelope having a second inflatable tube structure interconnected with said first inflatable tube structure and encompassing said charging opening, said second inflatable tube structure maintaining said charging opening in an open condition for receiving said hot air to fill the envelope when said second inflatable tube structure is inflated; and means for supplying gas to said second inflatable tube structure to maintain an inflated condition thereof, said means for supplying gas including an air pump.

* * * * *